US010242281B2

(12) United States Patent
Getz et al.

(10) Patent No.: US 10,242,281 B2
(45) Date of Patent: Mar. 26, 2019

(54) HYBRID ORIENTATION SYSTEM

(71) Applicant: RideOn Ltd., Tel-Aviv (IL)

(72) Inventors: Alon Getz, Haifa (IL); Ori Dov Kotek, Tel-Aviv (IL)

(73) Assignee: RideOn Ltd., Haifa (IL)

( * ) Notice: Subject to any disclaimer, the term of this patent is extended or adjusted under 35 U.S.C. 154(b) by 0 days.

(21) Appl. No.: 15/201,692

(22) Filed: Jul. 5, 2016

(65) Prior Publication Data

US 2017/0004371 A1   Jan. 5, 2017

Related U.S. Application Data

(60) Provisional application No. 62/188,668, filed on Jul. 5, 2015.

(51) Int. Cl.
| | | |
|---|---|---|
| G06K 9/32 | (2006.01) | |
| G01S 5/16 | (2006.01) | |
| G01S 3/786 | (2006.01) | |
| G01S 19/19 | (2010.01) | |
| G01S 19/31 | (2010.01) | |
| G01S 19/52 | (2010.01) | |
| G06T 7/73 | (2017.01) | |

(52) U.S. Cl.
CPC .......... *G06K 9/3208* (2013.01); *G01S 3/7865* (2013.01); *G01S 5/163* (2013.01); *G01S 19/19* (2013.01); *G01S 19/31* (2013.01); *G06T 7/74* (2017.01); *G01S 19/52* (2013.01); *G06T 2207/10016* (2013.01); *G06T 2207/30244* (2013.01)

(58) Field of Classification Search
None
See application file for complete search history.

(56) References Cited

U.S. PATENT DOCUMENTS

| | | | | |
|---|---|---|---|---|
| 6,427,122 B1* | 7/2002 | Lin | ...................... | G01C 21/165 342/26 B |
| 9,031,809 B1* | 5/2015 | Kumar | ................. | G01C 21/165 702/150 |
| 2002/0008661 A1* | 1/2002 | McCall | ................ | G01C 21/165 342/357.3 |
| 2007/0257837 A1* | 11/2007 | Watanabe | ............... | G01S 19/49 342/357.37 |
| 2008/0167814 A1* | 7/2008 | Samarasekera | ...... | G01C 21/005 701/469 |

(Continued)

*Primary Examiner* — Soo Shin

(57) ABSTRACT

A method and system including a camera adapted to capture frame image data, an orientation detector adapted to sense an orientation of the camera relative to an inertial frame of reference, a GPS receiver adapted to generate location data indicative of a velocity vector of the system relative to the inertial frame of reference, and a processor adapted to: upon receiving a frame image data, identify reference objects in the frame image data, calculate an orientation of the camera relative to the velocity vector based on a displacement of the reference object between at least two frames, predict an orientation of the camera relative to the velocity vector based on the sensed orientation by the detector, calculate a correction for the sensed orientation by comparing the calculated orientation to the predicted orientation, and upon receiving a sensed orientation, use the orientation correction for calculating a corrected orientation.

19 Claims, 9 Drawing Sheets

(56) References Cited

U.S. PATENT DOCUMENTS

| | | | |
|---|---|---|---|
| 2010/0158321 A1* | 6/2010 | Shah | G06T 7/73 |
| | | | 382/107 |
| 2011/0178708 A1* | 7/2011 | Zhang | G01C 21/165 |
| | | | 701/501 |
| 2012/0078510 A1* | 3/2012 | Ma | G01C 21/165 |
| | | | 701/426 |
| 2012/0176492 A1* | 7/2012 | Garin | H04N 7/18 |
| | | | 348/116 |
| 2016/0005164 A1* | 1/2016 | Roumeliotis | G01C 21/165 |
| | | | 348/116 |

* cited by examiner

HYBRID ORIENTATION SYSTEM

RELATED APPLICATION

This application claims the benefit of priority under 35 USC 119(e) of U.S. Provisional Patent Application No. 62/188,668 filed Jul. 5, 2015, the contents of which are incorporated herein by reference in their entirety.

FIELD AND BACKGROUND OF THE INVENTION

Some mobile and/or wearable equipment for outdoor activity include orientation devices with AHRS sensors. Such equipment may often include cameras and/or vision devices, wherein the line of sight direction may be different from the velocity direction of the device.

There are known orientation devices that use magnetometers, corrected by Altitude Heading Reference System (AHRS) and Global Positioning System (GPS) data used as input for a Kalman filter, in order to find the motion direction relative to the true north. Such systems are usually inherently inaccurate and affected by metals and magnetic disturbances.

Other, more accurate inertial sensor systems are usually very expensive, heavy and too large for outdoor activity user equipment.

SUMMARY OF THE INVENTION

According to an aspect of some embodiments of the present invention there is provided a system including a camera adapted to capture frames and to provide image data of each captured frame, an orientation detector adapted to sense an orientation of the camera relative to an inertial frame of reference, a GPS receiver adapted to generate location data indicative of a velocity vector of the system relative to the inertial frame of reference, and a processor adapted to, upon receiving a frame image data, identify reference objects in the frame image data, calculate an orientation of the camera relative to the velocity vector based on a displacement of the reference object between at least two frames, predict an orientation of the camera relative to the velocity vector based on the sensed orientation by the detector, calculate a correction for the sensed orientation by comparing the calculated orientation to the predicted orientation, and, upon receiving a sensed orientation, use the orientation correction for calculating a corrected orientation.

In some embodiments of the present invention, the processor is configured to generate a database storing for each frame at least one identified reference object included in this frame, and for each identified reference object, locations of the reference object in a reference frame of the camera along with identities of frames in which the object appears, and momentary GPS velocity data.

In some embodiments of the present invention, the processor is configured to calculate reliability score for an identified reference object.

In some embodiments of the present invention, the processor is configured to locate in the camera frame of reference an identified reference object appearing in more than one frame, and calculate a displacement of the reference object between two frames.

In some embodiments of the present invention, the processor is configured to record a previous inertial orientation of the system, calculate an estimated inertial orientation, based on a physical model and the previously recorded inertial orientation, and update the estimated orientation by the calculated correction and record the updated inertial orientation for a next estimation calculation. The updated inertial orientation may be provided to a user.

In some embodiments of the present invention, the processor is configured to, once a frame image data is received, detect in the received frame image data instances of known reference objects stored in a database, and calculate a reliability score for each detected reference object.

In some embodiments of the present invention, the processor is configured to detect new reference objects and add detected new reference objects to the database, and calculate a reliability score for each detected new reference object.

In some embodiments of the present invention, the processor is configured to remove a reference object from the database in case a known reference object is not detected along a predetermined number of consecutive frames.

In some embodiments of the present invention, the processor is configured to, once a frame image data is received, select a previous frame from a database, estimate position and velocity of the system at a time of capture of the selected previous frame, retrieve from the database reference objects included in the selected frame and their locations in the selected frame, and calculate a displacement between the location of a selected reference object in the selected previous frame and the location of the same selected reference object in a reference frame. The previous frame may be selected according to a pre-determined time slot between the selected frame and the new frame image data.

In some embodiments of the present invention, the position and velocity of the system at a time of capture of the selected previous frame may be estimated according to motion data received from the GPS receiver and a physical model. The processor may be configured to determine according to predetermined thresholds when the angular velocity of the system is too high or when the system moves too slowly.

In some embodiments of the present invention, the processor is further configured to select the reference objects with reliability score above a predetermined threshold.

In some embodiments of the present invention, the processor is further configured to calculate the orientation of the camera relative to the motion direction of the system between the selected reference frame and the reference frame, by calculating, for multiple selected reference objects, the displacement between the location of a selected reference object in the selected previous frame and the location of the same selected reference object in the reference frame, and estimating the orientation by finding an orientation of the camera that produces the calculated angular displacements in optimal approximation.

In some embodiments of the present invention, the processor is further configured to calculate a predicted displacement between the location of the selected reference object in the selected previous frame and a predicted location of the same selected reference object in the reference frame according to orientation data received from the orientation sensor units, compare the predicted displacement to the calculated displacement, and calculate a correction of the sensed orientation that minimizes a difference between the calculated and predicted displacements.

According to an aspect of some embodiments of the present invention there is provided a method including, upon receiving a frame image data by a processor, identifying reference objects in the frame image data, wherein the frame image data is provided by a camera, calculating by the processor an orientation of the camera relative to a velocity vector generated based on location data from a GPS receiver, based on displacement of the reference object between two frames, predicting an orientation of the camera relative to the velocity vector based on an orientation of the camera relative to an inertial frame of reference sensed by and orientation detector, calculating a correction for the sensed orientation by comparing the calculated orientation to the predicted orientation, and, upon receiving a sensed orientation, using the calculated orientation correction for calculating, by the processor, a corrected orientation.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
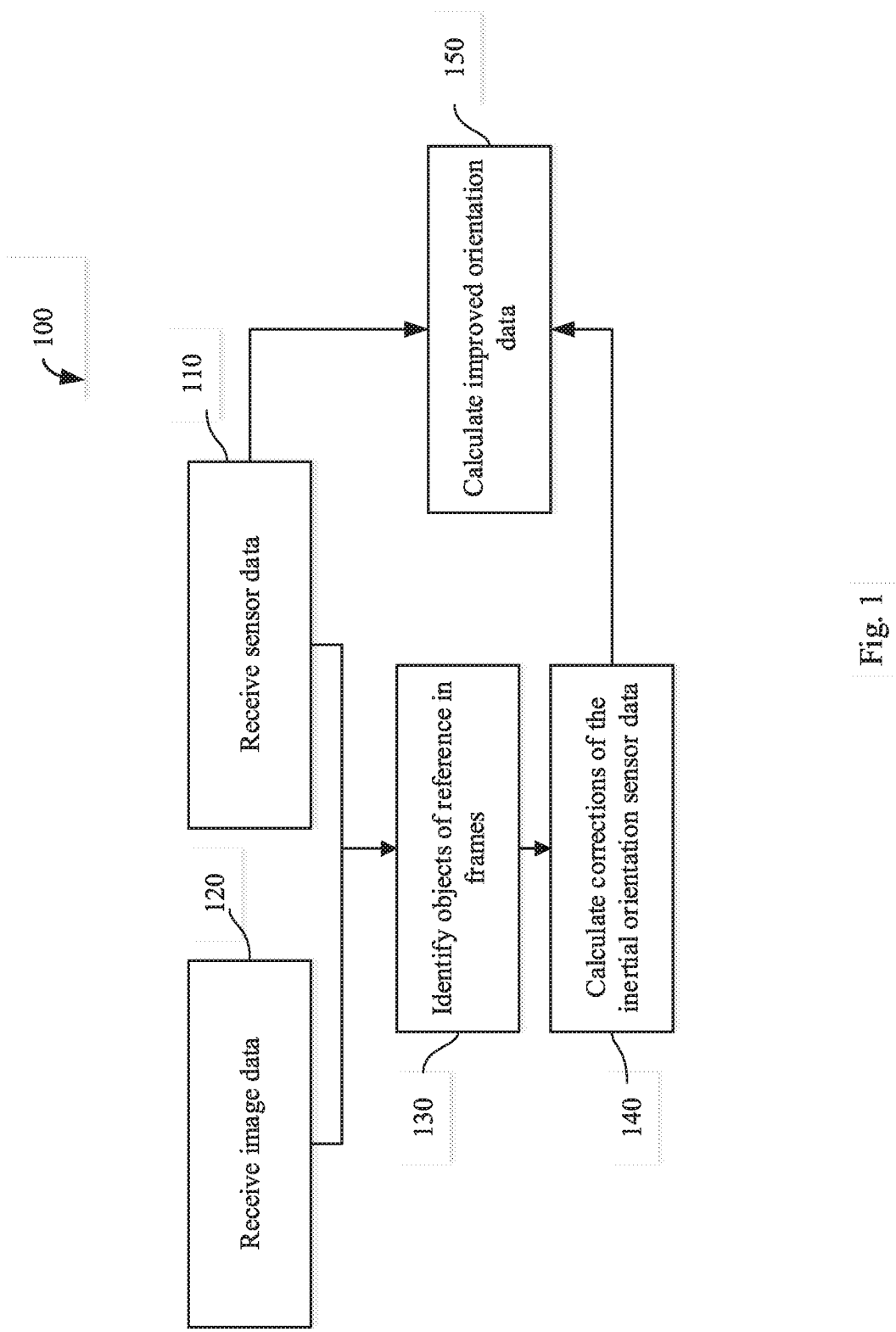
FIG. 1 is a schematic flowchart illustrating a hybrid orientation method according to some embodiments of the present invention.

Some embodiments of the present invention provide a system and method for improved inertial orientation measurement, by combining and analyzing data from orientation, motion and image sensors. Image data undergoes image processing for identifying reference objects in a series of images, and the reference objects are used for correction of orientation data. In some embodiments of the present invention, the correction method may be used in augmented reality devices for accurate overlaying of symbols on a real world vision.

According to some embodiments of the present invention, an improved accuracy of an estimated inertial orientation of a camera of an outdoor equipment device is provided. The improved accuracy of the estimated orientation is provided by using objects identified in frames captured by the camera as reference locations, and a velocity vector of the outdoor equipment device as provided by a GPS receiver. The image processing and GPS data are used for continuously correct and update AHRS sensors.

Therefore, some embodiments of the present invention improve accuracy of orientation sensors with relatively low power consuming and relatively light and cheap equipment, suitable for use during outdoor activity.

More specifically, some embodiments of the present invention may be used for improved estimation of an orientation of a camera and/or a vision device mounted on a user during outdoor activity, relative to a velocity direction of the user. Such vision device may facilitate better orientation of the user in any outdoor activity site, and may provide additional information about various points of interest.

In order to provide such features, which may require very accurate orientation tasks, more reliable tools than the regular light-weight orientation devices, e.g. Micro-Electro-Mechanical System (MEMS) gyroscopes, may be needed. However, as described herein above, known more accurate orientation devices may be too heavy, expensive, and/or power consuming for most outdoor activity uses.

Therefore, a solution for correction of orientation readings by image analysis, as provided by some embodiments of the present invention, may be very useful for such outdoor devices, by facilitating sufficiently accurate orientation estimation while using relatively light, cheap and economical components.

Accordingly, some embodiments of the present invention facilitate improved orientation, for example, for interactive/augmented vision devices, suitable for skiing, hiking, biking, and/or any other suitable outdoor and/or sports activity.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some embodiment of the present invention provide a system for improved orientation included in or attachable to one or more mobile and/or wearable equipment items, for example hiking, biking, skiing and/or any other suitable sports equipment, such as, for example, a helmet, glasses, a vision device or an action camera. In some embodiments, the orientation system may be included in or attachable to a vehicle or any other suitable portable device.

Figure 2:
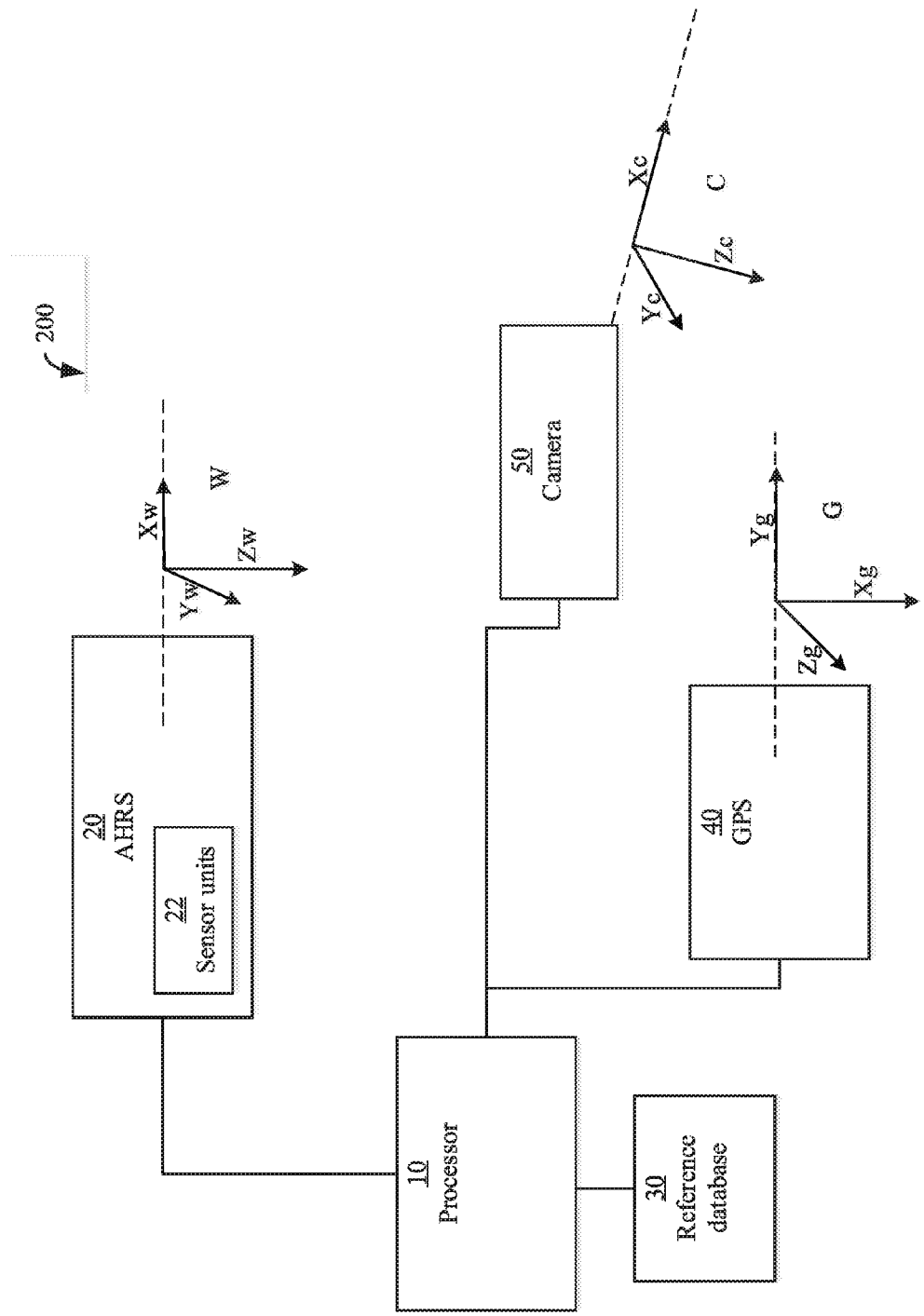
FIG. 2 is a schematic illustration of a hybrid navigation system according to some embodiments of the present invention.

Reference is now made to FIG. 1, which is a schematic flowchart illustrating a hybrid navigation method 100 according to some embodiments of the present invention. Further reference is made to FIG. 2, which is a schematic illustration of a hybrid navigation system 200 according to some embodiments of the present invention. System 200 may include a processor 10, an orientation detector 20 such as, for example, an Altitude Heading Reference System (AHRS), a database 30, a Global Positioning System (GPS) receiver 40 and a camera 50, for example a digital video camera. Orientation detector 20 is fixed mechanically to camera 50 or otherwise configured to detect the orientation of camera 50 relative to an inertial frame of reference.

More specifically, orientation detector 20 may include orientation sensor units 22 such as, for example, Micro-Electro-Mechanical System (MEMS) gyroscopes. Orientation sensor units 22 may sense orientation relative to a three-dimensional inertial frame of reference W. For example, sensor units 22 may include three sensor units positioned in respective three mutually perpendicular directions Xw, Yw and Zw that form inertial frame of reference W. Each sensor unit may sense orientation and/or position relative to a corresponding direction. For example, a sensor unit includes an accelerometer, a gyroscope and/or a magnetometer. In an exemplary embodiment, direction Xw points towards the true north direction, direction Yw points east and direction Zw points towards the center of Earth.

Camera 50 may capture frames, i.e. frame image data, in constant intervals that may be pre-configured by the camera manufacturer or, for example, set by processor 10. For example, the frame rate of camera 50 may be 24 frames per second (FPS), 25 FPS, 30 FPS, 48 FPS or any other suitable frame rate. The direction in which camera 50 is positioned may be estimated by processor 10 according to sensors data received from orientation detector 20. For example, camera 50 may have a line of sight direction Xc known to processor 10, along which the focal point of camera 50 is located. Line of sight direction Xc may be changed, for example, by a user. Processor 10 may analyze image data received from camera 50 by locating image elements in a frame of reference C of camera 50. Frame of reference C is formed by line of sight direction Xc, direction Yc pointing to the right of the captured frame and direction Zc pointing to the bottom of the captured frame, so that directions Xc, Yc and Zc are mutually perpendicular.

GPS receiver 40 may generate and send to processor 10 location data, e.g. positioning signals, which enable calculation of the velocity direction Yg of system 200. Thus, for example, processor 10 may calculate location of objects relative to a variable frame of reference G, formed by mutually perpendicular directions Xg, Yg and Zg. For example, direction Xg points to the center of Earth and direction Yg is the velocity direction of system 200.

Orientation detector 20, GPS receiver 40 and/or camera 50 may be controlled by and/or communicate with processor 10. According to some embodiments, as indicated in blocks 110 and 120, processor 10 receives inertial orientation sensor data from detector 20, system motion based on location sensor data from GPS receiver 40, and frame image data from camera 50. Based on the sensor data and image data, processor 10 provides improved orientation abilities as described in detail herein.

Frame image data of captured frames may be stored in reference database 30. As indicated in block 130, upon receiving frame image data from camera 50, processor 10 may perform image processing to identify in the stored frame image data objects of reference such as, for example, trees, rocks, traffic signs, and/or any other suitable stationary reference objects. Processor 10 may identify a reference object in the image data received from camera 50 and locate it in the camera frame of reference C. In case a reference object is identified in more than one frame along a certain period of time, as system 200 moves, it may appear in each frame in a different location in the camera frame of reference C. By image analysis of the reference objects, processor 10 may determine different locations of the reference objects in frame of reference C during a certain period of time. Processor 10 may compare image data of a series of frames and identify an object that appears in a series of frames, for example, during a few seconds. Processor 10 may track the identified object along the series of frames. An identified object may be used by processor 10 for relative orientation calculations, by using the object as a reference. In some embodiments of the present invention, an object may be identified in an image by Connected-Component Labeling or any other suitable method for identifying distinct regions in an image, such as Binary Large Objects (blobs).

In some embodiments, processor 10 calculates a reliability score for an identified object. For example, a fixed stationary object is usually reliable for calculations of relative orientation, and therefore may receive high reliability score. Processor 10 may deduce the reliability of the object based, for example, on the size and/or location changes of the identified object along the series of frames, based on the number of frames the object appears in, on the consistency of appearance across sequential frames, or on the similarity of the object across sequential frames. The reliability of an object is higher, for example, as the changes in size and/or location of an object implies that the object is a fixed stationary object, and/or as the number of frames the object appears in, the consistency of appearance across sequential frames, and/or the similarity of the object across sequential frames is higher. The similarity of an object across sequential frames may be calculated, for example, by computing a correlation between grey levels in the vicinity of the identified object in each image.

Processor 10 may identify an object as a reference objects when the reliability score of the object is above a predetermined threshold. Processor 10 may store and/or update in database 30 location data of identified objects such as, for example, the locations of a reference object are stored along with respective frames or identities of frames in which the object appears.

Then, as indicated in block 140, processor 10 may calculate correction of the inertial orientation sensor data based on the image data. In some embodiments of the present invention, processor 10 determines camera orientation, i.e. a rotation of line of sight Xc of camera 50 relative to the motion direction of system 200. The motion direction of system 200 is determined by the momentary velocity direction Yg received from GPS receiver 40. Based on the calculated relative camera orientation, processor 10 estimates errors in the inertial orientation sensor data, by comparing the calculated rotation to corresponding sensor data received from detector 20. For example, when new image data is received, processor 10 re-calculates the relative camera orientation, compares it to the orientation measured by detector 20, and then updates the inertial orientation data correction accordingly.

Upon receiving orientation sensor data from detector 20, as indicated in block 150, processor 10 may use the orientation data correction for estimating corrected inertial orientation of camera 50. For example, every time new sensor data about inertial orientation of camera 50 in inertial frame of reference W is received from detector 20, processor 10 re-calculates the corrected inertial orientation estimation, based on the updated orientation data correction. Additionally, processor 10 may provide the corrected inertial orientation estimation to a user.

Figure 3:
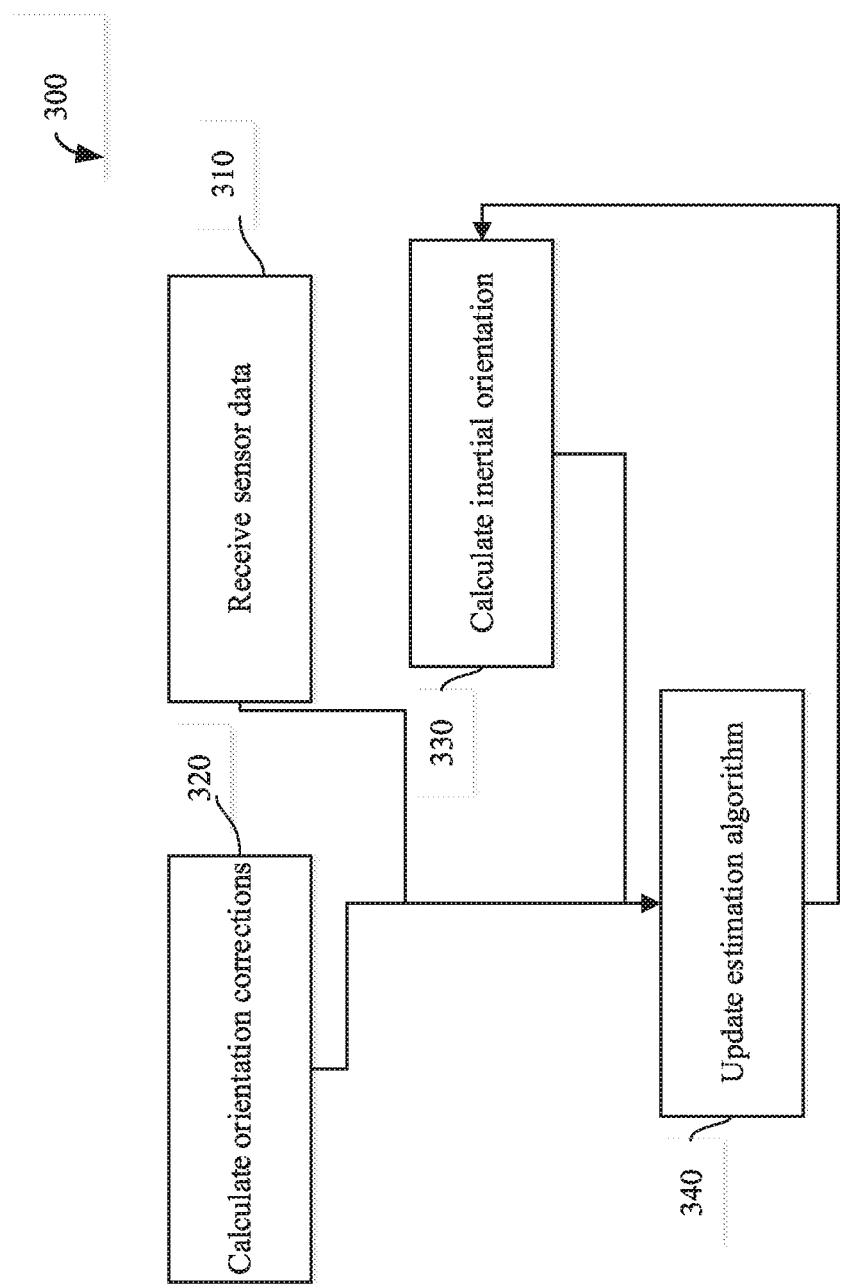
FIG. 3 is a schematic flowchart illustrating a method for inertial orientation estimation, according to some embodiments of the present invention.

Reference is now made to FIG. 3, which is a flowchart illustration of a method 300 for inertial orientation estimation, according to some embodiments of the present invention. As discussed herein, processor 10 may estimate an orientation of camera 50 in an inertial frame of reference W. As indicated in block 310, processor 10 may receive orientation sensor data from detector 20, indicative of the orientation of camera 50 in inertial frame of reference W. Additionally, as indicated in block 320, processor 10 may calculate orientation corrections according to the image data and motion data received from camera 50 and GPS receiver 40, respectively. As described in more detail herein, the orientation corrections may be calculated based on reference objects found by processor 10 in the image data.

As indicated in block 330, Processor 10 may calculate an estimated inertial orientation, based on a prediction algorithm such as, for example, by a Kalman filter prediction algorithm. Processor 10 may receive orientation sensor data from detector 20 and the calculated orientation corrections, and update the estimation algorithm accordingly, as indicated in block 340. The updated estimation algorithm may be used for calculating an updated estimated inertial orientation as indicated in block 330, which may be outputted as more accurate orientation data. The updated estimated inertial orientation may be recorded and used as input data for the prediction algorithm, and so on.

Figure 4:
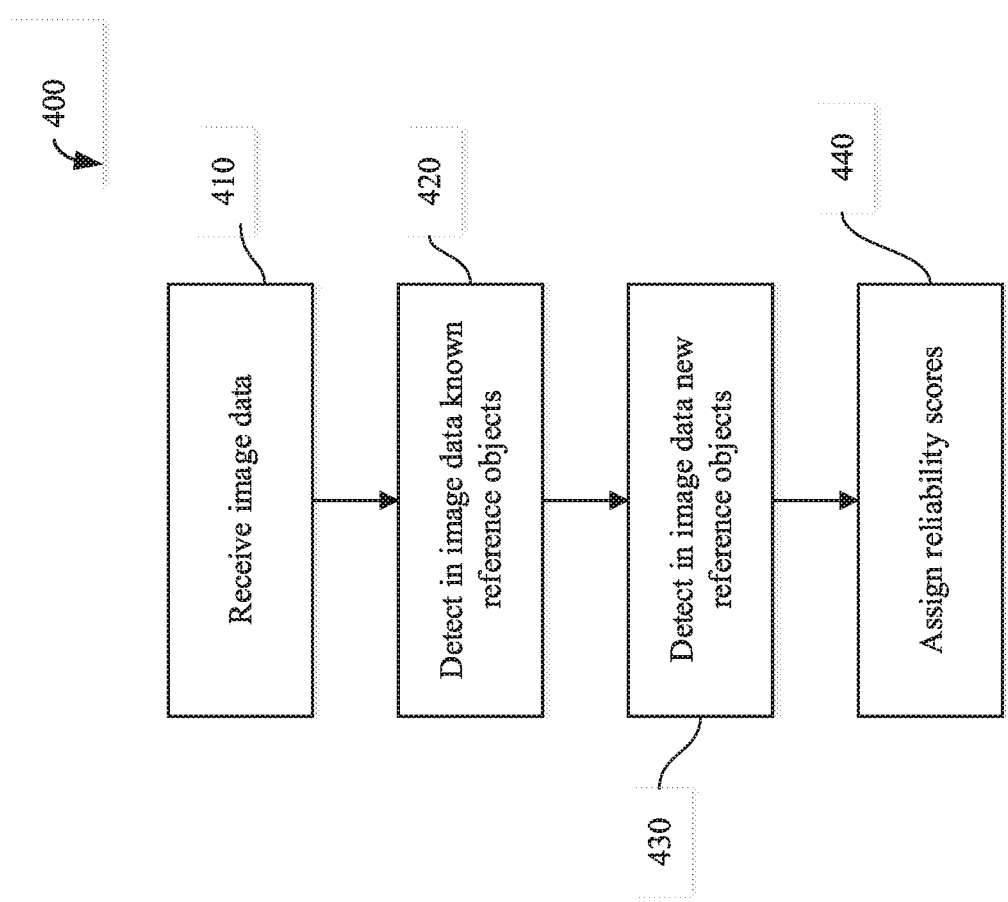
FIG. 4 is a schematic flowchart illustrating a method for analysis of reference objects in image data, according to some embodiments of the present invention.

Reference is now made to FIG. 4, which is a flowchart illustration of a method 400 for analysis of reference objects in image data, according to some embodiments of the present invention. As indicated in block 410, processor 10 may receive frame image data from camera 50 and inertial orientation data from detector 20. Processor 10 may generate database 30 storing, for a received frame, a set of identified reference objects included in this frame, and for each identified reference object, the locations of the object in the frames including it. Reference objects already stored in database 30 are referred herein as "known reference object(s)".

Once a new frame image data is received, as indicated in block 420, processor 10 may detect in the new frame image data instances of known reference objects. For example, processor 10 may look for a known reference object in the surroundings of the object's location in the last frame including it. For example, processor 10 may use Lucas-Kanade method for estimating the optical flow between the last frame including an object and the new frame, in order to estimate where the object might be in the new frame. In case a known reference object is found in the new frame image data, processor 10 may add to database 30 the location of the known reference object in the new frame and identification of the new frame in relation to the known reference object.

As indicated in block 430, processor 10 may analyze the new frame image data to detect new reference objects, not yet included in database 30. In case a new reference object is detected, processor 10 may add it to database 30, along with identification of the new frame and the location of the new reference object in the new frame.

In some embodiments of the present invention, in case a known reference object is not detected along a predetermined number of consecutive frames, processor 10 may remove the reference object from database 30. As indicated in block 440, processor 10 may calculate and/or assign to each reference object in database 30 a reliability score, indicative of the similarity of the object instances along a pre-determined number of consecutive frames in which the object appears. The reliability score may be generated, for example, by optical-flow estimation.

Figure 5:
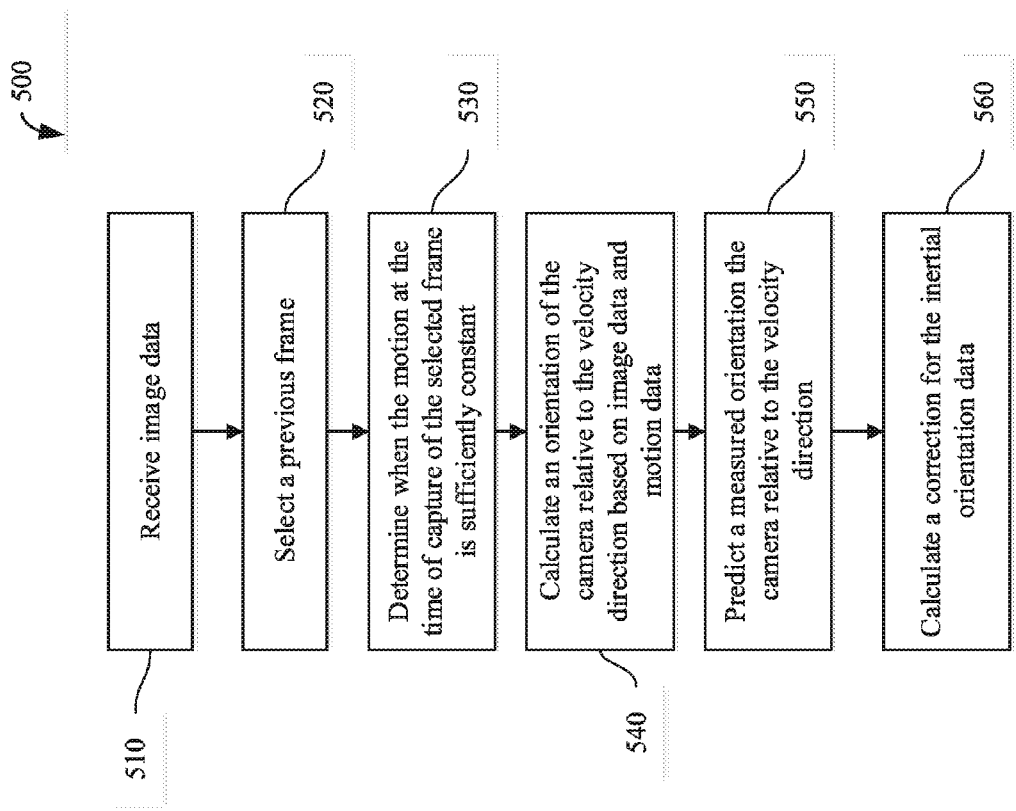
FIG. 5 is a schematic flowchart illustrating method for correcting inertial orientation data, according to some embodiments of the present invention.

Reference is now made to FIG. 5, which is a flowchart illustrating a method 500 for correcting inertial orientation data, according to some embodiments of the present invention. As described in detail herein, processor 10 may use mutual identified reference objects in a previous frame and in a recent frame to determine orientation of camera 50 relative to the velocity direction of system 200, and to calculate errors in sensor data of detector 20.

As indicated in block 510, processor 10 may receive a new frame image data. As indicated in block 520, processor 10 may select a previous frame from database 30. For example, the previous frame may be selected according to a pre-determined time slot between the selected frame and the new frame. The pre-determined time slot may be such that a pre-determined number of frames are captured during the time slot and/or such that sufficient motion data is received from GPS receiver 40 so as to reliably estimate the position and velocity of system 200. The predetermined time-slot may be of few seconds, for example 2-3 seconds.

In order to calculate the orientation correction, processor 10 requires image data taken during motion of system 200 in a sufficiently constant direction. Therefore, processor 10 determines when the motion at the time of capture of the selected frame is sufficiently constant, as indicated in block 530. Processor 10 may estimate position and velocity of system 200 at a time of capture of the selected previous frame, for example according to updated motion data received from GPS receiver 40 and a physical model of motion, for example of motion typical to a certain activity. Based on the motion data received from GPS receiver 40 during the time slot between the selected previous frame and the newly received frame, processor 10 may determine when the angular velocity of system 200 is too high or system 200 moves too slowly, for example according to predetermined thresholds. In case of too high angular velocity or too slow movement, processor 10 may wait for a next new frame image data.

In order to calculate a correction to the measurements of detector 20, in some embodiments of the present invention, processor 10 compares measured orientation of camera 50 to orientation calculated by image processing. As indicated in block 540, processor 10 may calculate an orientation of camera 50 relative to the velocity direction of system 200, based on captured image data and motion data from GPS receiver 40. For example, by using selected reference objects, processor 10 may determine the orientation of camera 50 relative to the motion direction of system 200. Processor 10 may retrieve from database 30 the reference objects included in the selected frame and their locations in the selected frame, and select the reference objects with reliability score above a predetermined threshold.

Processor 10 may calculate an orientation of camera 50 relative to the motion direction of system 200 between the selected frame and a reference frame, for example, a frame immediately before or after the selected reference frame, or the last frame before the selected frame that includes a same reference object. Reference is further made to FIGS. 6A-6D, which are schematic illustrations of orientation calculations made by processor 10, according to some embodiments of the present invention.

Figure 6A:
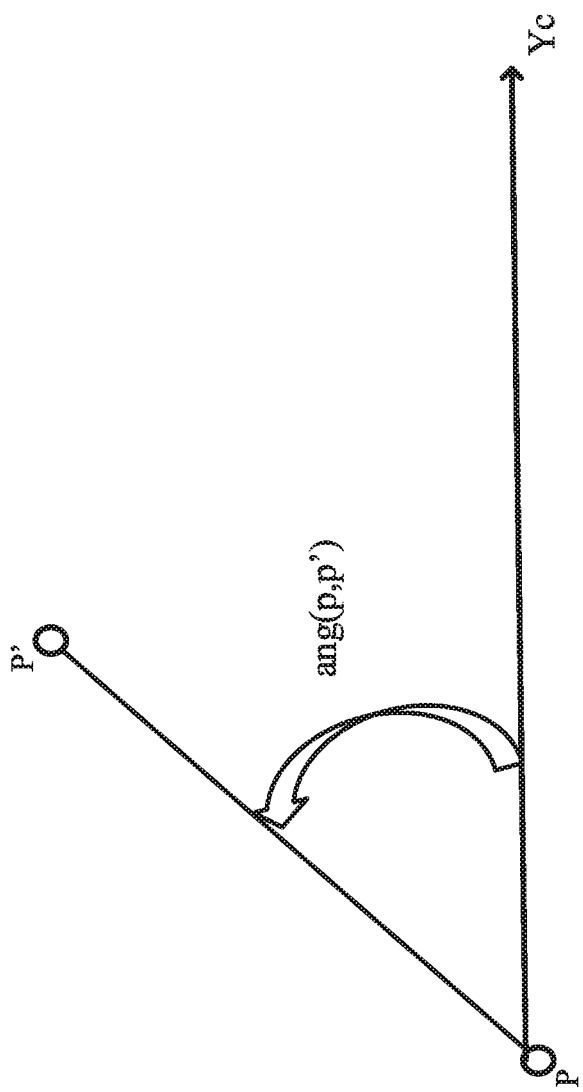
FIGS. 6A-6D are schematic illustrations of orientation calculations made by a processor, according to some embodiments of the present invention.

Processor 10 may calculate the orientation of camera 50 by calculating, for multiple selected reference objects, a displacement p-p' between a location p of a selected reference object in the selected frame and a location p' of the same selected reference object in the reference frame, projected on the same image plane, as shown in FIG. 6A. The calculated orientation of camera 50 relative to the velocity direction Yg may be deduced from an angle ang(p,p') between the displacement p-p' and axis Yc projected on the image plane. The deduced orientation of camera 50 may be more accurate as more selected reference objects are used calculation of respective angles ang(p,p').

As indicated in block 550, processor 10 may predict a measured orientation $_G^CR$ of camera 50 relative to the velocity direction Yg, according to sensor data from detector 20. The sensor data may be indicative of the rotation $_W^CR$ of camera 50 relative to inertial frame of reference W. The prediction may be made by neutralizing from the sensor data a rotation $_W^G R$ of the velocity direction Yg relative to inertial frame of reference W, by the equation:

$$_G^C R =\, _W^C R \cdot{}_G^W R =\, _W^C R \cdot{}_W^G R^{-1}$$

i.e. by applying on rotation $_W^C R$ the inverse of rotation $_W^G R$. $_W^G R$ is calculated according to a velocity vector of system 200 deduced from location readings received from GPS receiver 40 by the time of calculation and a motion model suitable to the type of activity.

In order to compare between the orientation of camera 50 measured by detector 20 to the orientation calculated by image processing, processor 10 may generate a location point p''' on the image plane, representing a hypothetical location of the selected reference object according to an orientation of camera 50 as measured by detector 20. Then, processor 10 may calculate a displacement p-p''' between the location p of a selected reference object in the selected frame and the hypothetical location p''' of the same selected reference object.

Figure 6B:
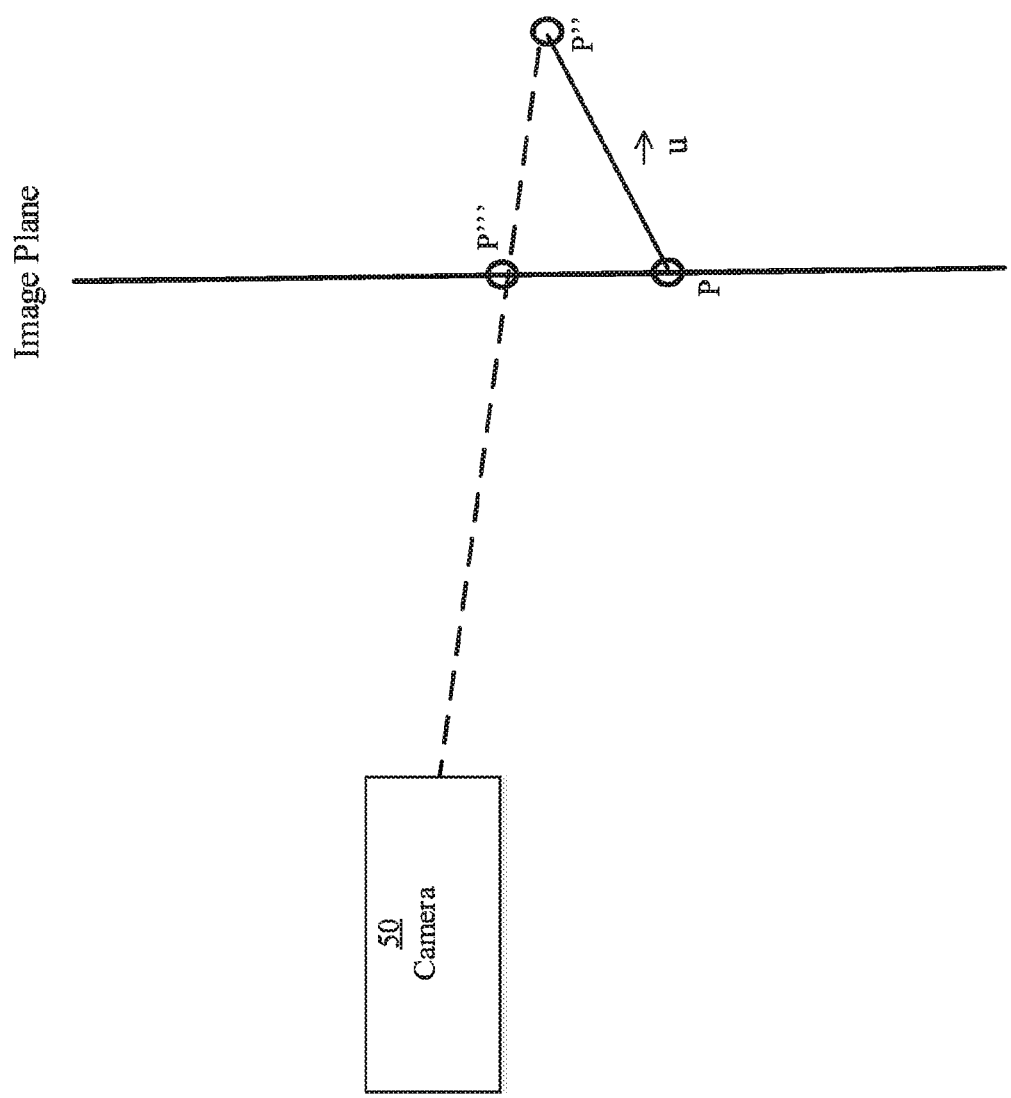

As shown in FIG. 6B, processor 10 may generate point p''' by re-projecting on the image plane an imaginary location p'' of the reference object moved by a small vector $\vec{u}$ in the movement direction of system 200 measured by detector 20, relative to the camera orientation $_G^C R$, for example:

$$\vec{u} = {}_G^C R \cdot \begin{pmatrix} 0.01 \\ 0 \\ 0 \end{pmatrix}$$

so that p''=p+$\vec{u}$. The measured orientation of camera 50 relative to the velocity direction Yg may be deduced from an angle ang(p,p''') between the displacement p-p''' and axis Yc projected on the image plane, shown in FIG. 6C. The deduced orientation of camera 50 may be more accurate as the number of selected reference objects for which an angle ang(p,p''') is calculated is larger.

Figure 6C:
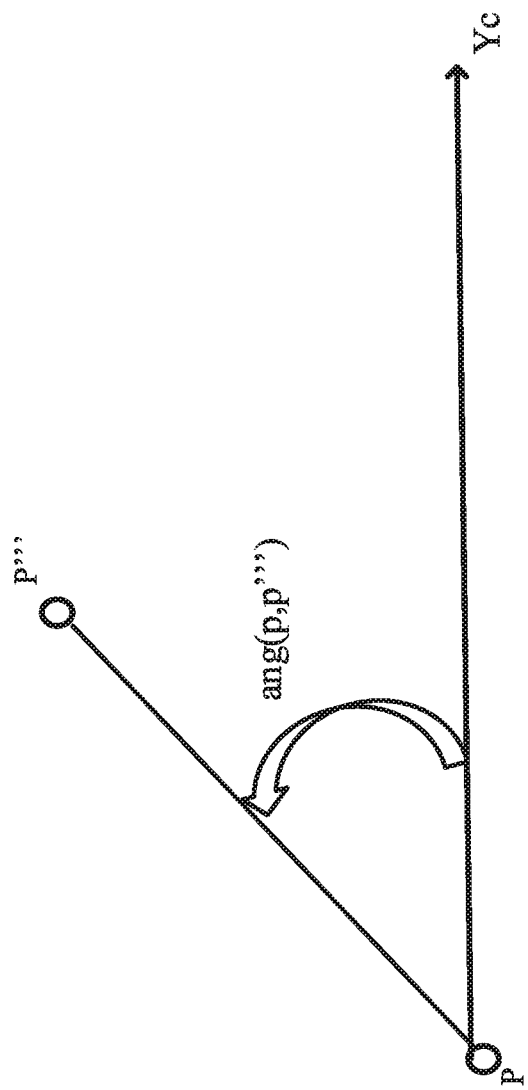
Figure 6D:
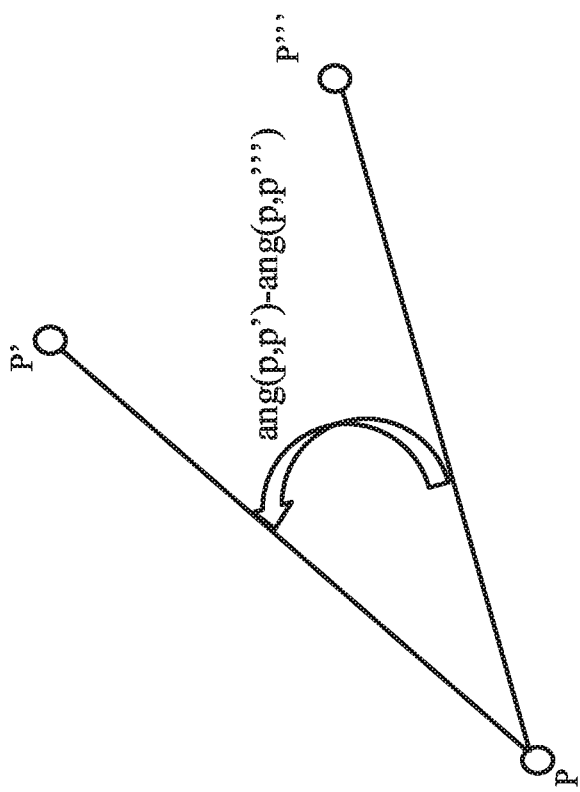

As indicated in block 560, processor 10 may calculate a correction for the inertial orientation data. The correction may be calculated according to the angular differences between the displacements p-p''' and p-p' of each selected reference object. The calculated angular differences may be adjusted to neutralize the difference in the momentary orientation of camera 50 relative to the motion direction of system 200 as described in detail herein. As describe above, according to the orientation data received from detector 20, processor 10 may predict, for example, calculate, a measured angular displacement ang(p,p'''), as shown in FIG. 6C. Processor 10 may then compare the predicted/measured angular displacement ang(p,p''') to the calculated angular displacement ang(p,p'). The difference ang(p,p')−ang(p,p'''), as shown in FIG. 6D, represents the error in the orientation of camera 50 measured by detector 20, i.e. the difference between the orientation of camera 50 calculated by image processing to the orientation of camera 50 measured by detector 20.

In order to minimize errors in the orientation sensor measurements, processor 10 may calculate a corrected measured orientation value, a corrected $_W^C R$, for which the sum of all errors is minimized. For example, processor 10 may minimize an error function $t(_W^C R)$, equals the sum of all error squares:

$$t(_W^C R) = \sum_i (ang(p_i, p'_i) - ang(p_i, p'''_i))^2$$

In order to find the corrected $_W^C R$, processor 10 may minimize $t(_W^C R)$ with respect to $_W^C R$, for example by using an unconstrained nonlinear optimization.

For example, in some embodiments of the present invention, processor 10 may define the following target error function in MATLAB, a sum of squared differences, dependent on $_W^C R$, such as, for example, error function $t(_W^C R)$:

function sum_sqr_diff=target_function(rot_c_w, fixed_inputs)

Then, an optimizer such as, for example, an unconstrained nonlinear optimizer as found, for example, in MATLAB optimization toolbox, may be used by processor 10 for finding the optimal rotation matrix $_W^C R$, resulting from minimizing the error function:

fminunc(@(x)target_function(x,fixed_inputs), measured_rot_c_w)

Then, processor 10 may calculate correction of the orientation sensor measurements by, for example, calculating required scaling and/or tunings of the orientation sensors and/or orientation measurements, which minimize the difference between the calculated and predicted angular displacement.

The methods as described above are used in the fabrication of integrated circuit chips.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system comprising:
a camera adapted to capture frames and to provide image data of each captured frame;
an orientation detector comprising at least one sensor, wherein said at least one sensor outputs orientation data indicative of an orientation of the camera relative to an inertial frame of reference, said at least one sensor comprising one of a magnetometer, an accelerometer and a gyroscope;
a GPS receiver adapted to generate location data indicative of a location of the system; and
a processor adapted to:
upon receiving, from said camera, respective image data of a captured frame, identify reference objects in the respective image data;
calculate a velocity vector of the system using the location data;
calculate a first orientation of the camera relative to the velocity vector based on a displacement of at least one of the identified reference objects between at least two of the captured frames;
calculate a second orientation of the camera relative to the velocity vector based on first orientation data output by said at least one sensor;
calculate a correction for the orientation data based on an angular difference between the first orientation and the second orientation; and
upon receiving second orientation data output by said at least one sensor, correct the second orientation data using the calculated correction, so as to compensate for a bias in the orientation data.

2. The system of claim 1, wherein said processor is configured to generate a database storing, for each of said identified reference objects, an identification of at least one frame in which said identified reference object appears and a respective location of said identified reference object in said at least one frame in which said identified reference object appears.

3. The system of claim 1, wherein said processor is configured to calculate respective reliability scores for each of the identified reference objects.

4. The system of claim 1, wherein said processor is configured to:
locate, in a frame of reference of the camera, at least one of the identified reference objects appearing in more than one frame; and
calculate a displacement of the located at least one of the identified reference objects between two frames.

5. The system of claim 1, wherein said processor is configured to:
record a previous inertial orientation of the system;
calculate an estimated inertial orientation, based on a physical model and the previously recorded inertial orientation; and
update the estimated inertial orientation by the calculated correction and record the updated estimated inertial orientation for a next estimation calculation.

6. The system of claim 5, wherein the updated inertial orientation is provided to a user.

7. The system of claim 1, wherein said processor is configured to:
once image data of at least one of said captured frames is received, detect, in said image data of at least one of said captured frames, instances of known reference objects stored in a database; and
calculate a respective reliability score for each of the detected instances of said known reference objects.

8. The system of claim 7, wherein said processor is further configured to:
detect new reference objects and add the detected new reference objects to the database; and
calculate a respective reliability score for each of the detected new reference object.

9. The system of claim 7, wherein said processor is further configured to:
detect that one of the reference objects stored in the database is absent along a predetermined number of consecutive frames; and
remove the absent reference object from the database.

10. The system of claim 1, wherein said processor is further configured to:

once the frame image data of one of said captured frames is received, select a previous frame from a database;

estimate position and velocity of the system at a time of capture of the selected previous frame;

retrieve from the database the identified reference objects included in the selected previous frame and locations of the identified reference objects in the selected previous frame; and calculate the displacement of the identified reference objects between the selected previous frame and a reference frame.

11. The system of claim 10, wherein the previous frame is selected according to a pre-determined time slot between the selected frame and a new frame image data.

12. The system of claim 10, wherein the position and velocity of the system at the time of capture of the selected previous frame is estimated according to the location data received from the GPS receiver and a physical model, and wherein the processor is further configured to determine according to predetermined thresholds when the angular velocity of the system exceeds a first predetermined threshold or when the system linear velocity is below a second predetermined threshold.

13. The system of claim 10, wherein said processor is configured to select the identified reference objects having respective reliability scores above a predetermined threshold.

14. The system of claim 10, wherein said processor is further configured to calculate the first orientation by:

calculating, for each of the identified reference objects, a respective angular displacement between a location of the identified reference object in the selected previous frame and a location of the same identified reference object in the reference frame; and estimating the first orientation as a camera orientation that produces an optimal approximation of the calculated angular displacements.

15. The system of claim 10, wherein said processor is further configured to:

calculate, according to the orientation data received from the orientation detector, a predicted displacement between a location of a selected identified reference object in the selected previous frame and a location of the same selected identified reference object in the reference frame;

compare the predicted displacement to the calculated displacement; and calculate the correction of the orientation data that minimizes the angular difference between the calculated and predicted displacements.

16. The system of claim 1, wherein the sensor comprises a magnetometer adapted to output data indicative of the magnetic north and the bias comprises a difference between true north and magnetic north.

17. The system of claim 1, wherein said orientation of said camera relative to said inertial frame of reference varies dynamically and said correcting second orientation data using the calculated correction is performed continuously to correct for said dynamic variation.

18. The system of claim 17, wherein said camera is mounted on a user and said orientation of said camera relative to said inertial frame of reference varies dynamically in accordance with a velocity direction of said user.

19. A method comprising:

in a hardware processor configured to execute program code:

upon receiving image data of a respective captured frame, identifying reference objects in the image data, wherein the image data is provided by a camera;

calculating a velocity vector of the system based on location data provided by a GPS receiver;

calculating a first orientation of the camera relative to the velocity vector, based on a displacement of at least one of the identified reference objects between at least two frames;

calculating a second orientation of the camera relative to the velocity vector based on first orientation data sensed by at least one sensor in an orientation detector, wherein said orientation data is indicative of an orientation of the camera relative to an inertial frame of reference;

calculating a correction for the orientation based on an angular difference between the first orientation and the second orientation; and upon receiving second orientation data sensed by said at least one sensor in the orientation detector, correcting the second orientation data using the calculated orientation correction, so as to compensate for a bias in the orientation data, said at least one sensor comprising one of a magnetometer, an accelerometer and a gyroscope.

* * * * *